(12) United States Patent
Brebner

(10) Patent No.: US 8,266,583 B1
(45) Date of Patent: Sep. 11, 2012

(54) FLEXIBLE PACKET DATA STORAGE FOR DIVERSE PACKET PROCESSING APPLICATIONS

(75) Inventor: Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 999 days.

(21) Appl. No.: 12/253,793

(22) Filed: Oct. 17, 2008

(51) Int. Cl.
*G06F 9/44* (2006.01)
(52) U.S. Cl. ....................................................... 717/108
(58) Field of Classification Search ................... 717/108
See application file for complete search history.

(56) References Cited

U.S. PATENT DOCUMENTS

| | | | | |
|---|---|---|---|---|
| 6,900,812 | B1 * | 5/2005 | Morein | 345/540 |
| 2004/0019873 | A1 * | 1/2004 | Pochayevets et al. | 717/101 |
| 2009/0034546 | A1 * | 2/2009 | Nagata | 370/401 |
| 2009/0046729 | A1 * | 2/2009 | Nagata | 370/401 |

OTHER PUBLICATIONS

Xilinx, Inc., "Xilinx Solution for Traffic Management," PN 0010934, copyright 2006, pp. 1-2, available from Xilinx, Inc., 2100 Logic Drive, San Jose, California 95124, USA.
Xilinx, Inc., "ATM Adaptation Layer 5 (AAL5)," Product Specification, Jun. 21, 2004, pp. 1-19, available from Xilinx, Inc., 2100 Logic Drive, San Jose, California 95124, USA.
Xilinx, Inc., "Packet Queue v2.2," DS509, Aug. 8, 2007, pp. 1-25, available from Xilinx, Inc., 2100 Logic Drive, San Jose, California 95124, USA.

* cited by examiner

*Primary Examiner* — Philip Wang
(74) *Attorney, Agent, or Firm* — Kevin T. Cuenot

(57) ABSTRACT

A computer-implemented method of developing a packet processing application can include receiving a user input specifying a first function and a second function and automatically generating a high level programming language description of the packet processing application including a packet data storage unit (605, 610, 615). Packet units can be stored within the packet data storage unit at locations determined according to the first function and the second function. The high level programming language description also can be stored (630).

20 Claims, 4 Drawing Sheets

300

```
// IPv4 header format
  format F_IPv4_header = (
    VERSION : 4,
    IHL : 4,
    COS : 8,
    TOT_LEN : 16,
    ID : 16,
    FLAGS : 3,
    FRAG_OFFSET : 13,
    TTL : 8,
    PROTOCOL : 8,
    HDR_CHKS : 16,
    SA : 32,
    DA : 32
  );

equivalence = p1.ID == p2.ID;
ordering = p1.FRAG_OFFSET
    < p2.FRAG_OFFSET;
```

FIG. 3

FLEXIBLE PACKET DATA STORAGE FOR DIVERSE PACKET PROCESSING APPLICATIONS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The embodiments disclosed herein relate to the development of packet processing applications. More particularly, the embodiments relate to a generalized and automated technique for creating packet processing applications.

BACKGROUND OF THE INVENTION

Packet processing is an important aspect of many different networking systems. Examples of the different packet processing applications can include traffic management over multiple packet flows, segmentation and reassembly of packets, re-sequencing of packets, multiplexing and de-multiplexing of packet-based channels, as well as simple packet buffering. A packet processing application should perform these functions correctly and efficiently. In terms of efficiency, the packet processing application should operate quickly and utilize memory resources in a judicious manner. That is, the packet processing application should be able to store and access data at a high rate of speed and store packet data in a manner that does not unduly waste available memory.

A packet processing application typically includes data storage hardware and processing functions that dictate how the hardware will operate. For example, the processing functions can dictate how and where packet data is stored and/or how and from where packet data is retrieved. The parameters to which each packet processing application must conform can vary widely from one application to another. As such, it is typically the case that a custom packet processing solution is developed each time a packet processing application is needed. This continual development of customized solutions, in reference to the packet storage hardware and the processing functions, often leads to duplication of effort in finding efficient packet processing solutions and inconsistent use models that tend to confuse the packet processing application designer.

SUMMARY OF THE INVENTION

The embodiments disclosed herein relate to a generalized and automated technique for developing a packet processing application. One embodiment of the present invention can include a computer-implemented method of implementing a packet processing system. The computer-implemented method can include receiving a user input specifying a first function and a second function and automatically generating a high level programming language description of a packet processing application comprising a packet data storage unit. Packet units can be stored within the packet data storage unit at locations determined according to the first function and the second function. The method also can include storing the high level programming language description.

The computer-implemented method can include selecting the first function to define whether at least two packet units are members of a same equivalence class. The first function can be defined to depend upon at least one field of the packet units. Automatically generating a high level programming language description can include outputting high level programming language code defining the packet data storage unit to store packet units that are members of the same equivalence class within a same row of the packet data storage unit.

The computer-implemented method further can include selecting the second function to define an ordering of at least two packet units that have been determined to be members of a same equivalence class. The second function can be defined to depend upon at least one field of the packet units. Automatically generating a high level programming language description can include outputting high level programming language code defining the packet data storage unit to order packet units that are members of a same equivalence class according to the second function.

The computer-implemented method can include selecting the high level programming language to be a hardware description language or a functional, general-purpose high level programming language. Receiving a user input specifying a first function and a second function can include receiving declarative programming language code specifying the first function and the second function.

Another embodiment of the present invention can include a computer-implemented method of specifying a packet processing system including receiving a declarative description of packet units to be processed and selecting, from within the declarative description, a first function determining packet unit equivalence and a second function determining packet unit ordering among packet units determined to be members of a same equivalence class according to the first function. The method can include automatically generating a high level programming language description of a packet processing application according to the first function and the second function and storing the high level programming language description.

Automatically generating a high level programming language description of a packet processing application can include specifying a packet data storage unit including rows mapped to potential values of the first function. Packet units of a same equivalence class can be ordered within each row according to the second function. The first function can depend upon at least one field of the packet units. The second function also can depend upon at least one field of the packet units.

Another embodiment of the present invention can include a computer program product including a computer-usable medium having computer-usable program code that implements a packet processing system. The computer-usable medium can include computer-usable program code that receives a user input specifying a first function and a second function and computer-usable program code that automatically generates a high level programming language description of a packet processing application including a packet data storage unit. Packet units can be stored within the packet data storage unit at locations determined according to the first function and the second function. The computer-usable medium also can include computer-usable program code that stores the high level programming language description.

The computer-usable medium can include computer-usable program code that selects the first function to define whether at least two packet units are members of a same_ equivalence class and computer-usable program code that defines the first function to depend upon at least one field of the packet units. The computer-usable program code that automatically generates a high level programming language description can include computer-usable program code that outputs high level programming language code defining the packet data storage unit to store packet units that are members of the same equivalence class within a same row of the packet data storage unit.

The computer-usable medium further can include computer-usable program code that selects the second function to define an ordering of at least two packet units that have been determined to be members of a same equivalence class and computer-usable program code that defines the second function to depend upon at least one field of the packet units. The computer-usable program code that automatically generates a high level programming language description can include computer-usable program code that outputs high level programming language code defining the packet data storage unit to order packet units that are members of a same equivalence class according to the second function.

The computer-usable medium also can include computer-usable program code that selects the high level programming language to be a functional, general-purpose high level programming language or a hardware description language.

The computer-usable program code that receives a user input specifying a first function and a second function can include computer-usable program code that receives declarative programming language code specifying the first function and the second function. The computer-usable medium can include computer-usable program code that identifies at least one field and attribute of the field from the declarative programming language code.

BRIEF DESCRIPTION OF THE DRAWINGS

FIG. 3 is an example of a programmatic description of a header of a packet unit in accordance with another embodiment of the present invention.

DETAILED DESCRIPTION

Figure 1:
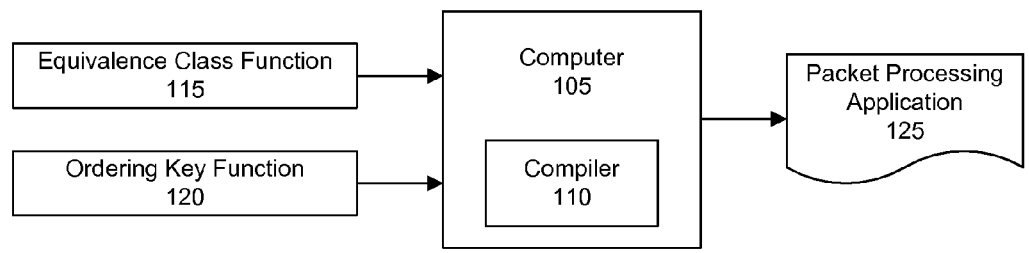
FIG. 1 is a first block diagram illustrating a system for automatically generating a packet processing application in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

When creating a packet processing application, variations on arrays for fixed-length packet data and linked lists for storing variable length packet data can be used. Typically, linked lists are formed from fixed-length cells allocated from a free cell list. Within conventional approaches to packet processing application development, the way in which the arrays or linked lists are provisioned and accessed depends upon the particular packet processing application that is being developed. Custom solutions are developed for each particular packet processing application. This focus on the application level tends to obscure any commonality that may exist from one packet processing application to the next. In consequence, the use models that are developed tend to focus heavily upon the nature of the data that is being stored rather than viewing application development from the packet level.

The embodiments disclosed herein relate to a generalized and automated technique for developing a packet processing application. In accordance with the embodiments disclosed within this specification, a unified use model is provided that can be used by developers to implement packet processing applications. Once specified, the use model can be translated into a packet processing application.

In general, a user may provide one or more inputs specifying functions. Each function can define or specify the manner in which packet data is to be stored, or subsequently accessed, within the packet processing application being developed. These functions define the implementation of the packet data storage unit, e.g., the physical circuitry that stores packet data, used within the packet processing application as well as the behavior of the packet storage application, e.g., the processing functions defining how packet data is stored and/or retrieved. This allows the same use model to be used generically for different packet processing applications.

As used within this specification, the phrase "packet unit" will refer to a unit of data that is routed between a source and a destination node within a packet-switched network. A packet unit can refer to, for example, an Internet Protocol (IP) packet, a fragment of a packet, a fixed sized cell that forms a packet, a frame, a block, or the like. When data is transmitted over a packet-switched network, that data is subdivided into smaller portions. Each portion, e.g., a packet unit, can be sent individually with the various packet units being re-assembled at the destination. Each packet unit can have a defined structure. In general, a packet unit can include a header, payload, and a trailer.

The header can include one or more fields that carry information about the data within the payload of the packet unit or other portions of the packet unit. For example, depending upon the particular packet processing application, the header may specify the length of the packet unit, synchronization information, a packet number, a destination address, a protocol that defines the type of packet unit being sent, and/or an originating address. The payload, as noted, includes the actual data that is being transmitted. The trailer can include or specify a symbol or other data indicating the end of the packet unit and further may include a field for use in error checking.

FIG. 1 is a first block diagram illustrating a system 100 for automatically generating a packet processing application in accordance with one embodiment of the present invention. As shown, system 100 can include a computer 105 executing a compiler 110.

Computer 105, e.g., a data processing system or a computer system, can be one that is suitable for storing and/or executing program code. Accordingly, computer 105 can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices such as, for example, keyboards, displays, pointing devices, etc., can be coupled to computer 105 either directly or through intervening I/O controllers. Network adapters may also be coupled to computer 105 to enable computer 105 to become coupled to other computers, devices, or remote printers or storage devices through intervening private or public networks. Modems, cable modems, and Ethernet cards are just a few of the currently available types of network adapters.

As pictured in FIG. 1, compiler 110 can be provided with an equivalence class function 115 and an ordering key function 120. The equivalence class function 115, e.g., the first function, can be denoted as $f(p)$. The ordering key function 120, e.g., the second function, can be denoted as $g(p)$. Within each of functions 115 and 120, the variable p represents a given packet unit.

Functions 115 and 120 can be provided in the form of one or more user inputs. In one embodiment, function 115 and function 120 may be provided individually or in combination through a user interface generated by compiler 110 while executing within computer 105. One or more other parameters such as fields of the packet units and attributes of those fields may also be provided to compiler 110 via such a user interface.

In another embodiment, function 115 and function 120 can be provided as part of a declarative description. For example, functions 115 and 120 and any other attributes of the packets to be processed can be provided in the form of a declarative description that is suited to describing packet units and packet processing behavior, but which does not directly indicate or specify any particular physical implementation of the packet processing application by some combination of hardware and software. Specific implementation details relating to hardware, for example, can be left to other implementation tools. Thus, the declarative description can specify function 115, function 120, one or more fields of packets units to be processed, and attributes of those fields.

Generally, a declarative language is a high level programming language that defines relationships among different objects, but does not dictate how to compute an answer. A purely declarative language generally does not "compute" anything. The relationships defined by the declarative description, however, may be used by another system or computer program to perform computations. By comparison, a computer program implemented using a functional, high level programming language may have declarative aspects, but will also include a function that creates a linkage between the input provided to the computer program and the output generated by the computer program. In other words, a functional computer programming language performs computations upon inputs in order to generate outputs.

Compiler 110 can process the received input(s) and translate the information into a packet processing application 125. The packet processing application 125 can be specified as a high level programming language description. In one embodiment, packet processing application 125 can be specified in a hardware description language (HDL) such as Verilog or VHDL. An HDL description can include, for example, explicit memory elements or an interface to external memory elements for storing packets, expressions for computing $f(p)$, $g(p)$, and for comparing values of $f(p)$ and $g(p)$ for different packets, a mechanism for selecting a memory element based on these computations, and a mechanism for inserting a packet into this memory element based on these calculations. A mechanism and expression for removal of data packets and a "ready" feature indicating that data is ready for removal also may be specified in the HDL description. Accordingly, packet processing application 125 can be provided to a computer aided design tool or other integrated circuit (IC) implementation tool, which can generate a specific hardware implementation depending upon the target IC that will be used to implement the packet processing application.

For example, a electronic design automation (EDA) tool can process description 125 and generate a netlist or other type of configuration file or files that may be used to implement or fabricate an IC. In the case where the target IC is programmable, whether partially or fully programmable, the HDL that is output can be further processed to generate a bitstream, that when loaded into the target IC, will implement packet processing application 125. As used herein, the phrase "packet processing application" can refer to a packet data storage unit and the packet processing functions. The packet data storage unit can refer to the physical memory used to implement the packet processing application. The processing functions specify how packet data is written to, e.g., stored, within the packet data storage unit and how packet data is read, e.g., retrieved, from the packet data storage unit.

In the case where packet processing application 125 is specified in HDL, the packet data storage unit can be implemented as a memory embedded within the target IC. For example, in the case of a field programmable gate array (FPGA), the packet data storage unit can be implemented as a random access memory block, as a dual port block random access memory, or as any combination of one or more of the memory devices available upon such a device. When specified as HDL, it should be appreciated that the processing functions may be implemented using logic circuitry, e.g., the programmable fabric of the target IC, as a soft processor, or as a hard processor executing program code. The particular type of physical memory device used to implement the packet data storage unit and the particular implementation of the processing functions will depend upon the target IC used and the implementation tools used.

In another embodiment, packet processing application 125 can be specified in a functional, general-purpose, high level programming language such as C, C++, or the like. A functional, general-purpose, high level programming language description can include a declaration of one or more data structures for storing packets, expressions for computing $f(p)$, $g(p)$, and for comparing values of $f(p)$ and $g(p)$ for different packets, a function for accessing a data structure based on these computations, and a function for inserting a packet into the data structure based on these calculations. Functions for removal of data packets and a "ready" feature indicating that data is ready for removal also may be included in the resulting description. Accordingly, description 125 can be further compiled to create executable program code that, when executed by a computer, implements packet processing application 125. In yet another embodiment, packet processing application 125 can be specified in byte code that may be interpreted by a computer executing a suitable interpreter application.

In the case where packet processing application 125 is specified in a functional, general-purpose, high level programming language, it should be appreciated that the packet data storage unit will be implemented using memory of the computer. The processing functions will be implemented by the processor, executing programming code, to store and/or retrieve packet data from the physical memory of the computer.

The particular type of HDL or general-purpose, high level programming language used to specify packet processing application 125 is not intended as a limitation of the embodiments disclosed within this specification. Any suitable HDL or general-purposes, high level programming language may be used.

The equivalence class function 115 can define equivalence among different packet units. The ordering key function 120 can define ordering to be used among packet units that are defined as equivalent according to equivalence class function 115. Equivalence class function 115 and ordering key function 120 provide a flexible packet processing application model that can be applied to any of a variety of different packet processing applications. As such, the particular meaning of an equivalence class, as defined by the equivalence class function 115, and the particular meaning of the order of packet units, as defined by the ordering key function 120, will depend upon the particular packet processing application that is being implemented.

As noted, the equivalence class function 115 can be denoted as $f(p)$ and the ordering key function 120 can be denoted as $g(p)$. In general, given two packet units p and q, when $f(p)=f(q)$ the two packet units are considered to be equivalent. Thus, when the value of the function $f(p)$ is equal to the value of $f(q)$, the two packet units p and q can be said to be equivalent or belong to the same equivalence class. With respect to the ordering of packet units within a given equivalence class, packet unit p will come before packet unit q if, and only if, $g(p)<g(q)$. Similarly, within the same equivalence class, packet unit p will come after packet unit q if, and only if, $g(p)>g(q)$.

Figure 2:
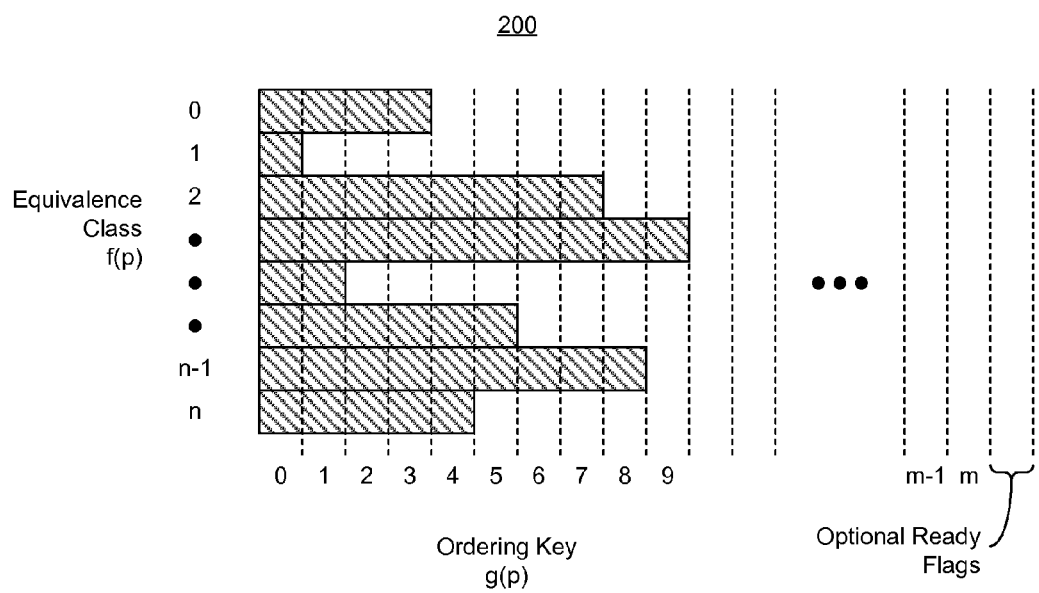
FIG. 2 is a second block diagram illustrating a technique for translating user-provided functions into a packet processing application in accordance with another embodiment of the present invention.

FIG. 2 is a second block diagram 200 illustrating a technique for translating user-provided functions into a packet processing application in accordance with another embodiment of the present invention. FIG. 2 depicts a two dimensional representation of the organization of the packet processing application that can be inferred from the equivalence class function $f(p)$ and the ordering key function $g(p)$. As noted, the packet processing application can be specified in the form of a high level programming language description. More particularly, block diagram 200 illustrates a two dimensional representation of the packet data storage unit that can be created for the packet processing application.

In block diagram 200, the different types of equivalence classes defined by $f(p)$ are represented in a first dimension as rows. In this example, the equivalence classes range from 0 to n along the vertical axis of block diagram 200, where n is an integer having a value greater than zero. Packet units determined to belong to the same equivalence class are stored in the same row. The ordering of packet units, within each respective equivalence class, is represented in the second dimension as columns. In this example, the ordering keys range from 0 to m along the horizontal axis, where m is an integer having a value greater than zero.

The combination of the equivalence class function $f(p)$ and the ordering key function $g(p)$ defines relationships among packet units that determine how the packet units are stored within, and retrieved from, the packet data storage unit of the packet processing application being developed. A simple example of either the equivalence class function and/or the ordering key function can be where one or both functions refer to the value of a particular field of a packet unit. A more complex example can be where one or both functions depends upon a plurality of fields of the packet units.

In general, any packet processing application will need to perform two primary functions. These functions are insertion of packet units into the packet data storage unit and removal of packet units from the packet data storage unit. To store a packet unit within the packet data storage unit, the equivalence class of the packet unit can be calculated to determine the proper row in which the packet unit is to be stored.

The ordering key can be calculated to determine the proper location within the row at which the packet unit will be stored. While ordering within a row may be from left to right or from right to left, for purposes of illustration, a left to right ascending order in terms of ordering key within each row will be assumed within this specification.

In one embodiment, when two or more packet units determined to be members of a same equivalence class are also determined to have a same ordering key, the order in which the packet units are stored within the selected row can be determined according to the time at which each respective packet unit is received by the packet data storage unit or the time at which each such packet unit is inserted into the row of the packet data storage unit.

Removal of packet units involves selecting the correct equivalence class, or row. This selection will be dependent upon an application specific reason. Once the correct equivalence class is located, the first, e.g., in this example, the left-most, packet unit can be removed from the queue.

The following examples are provided for purposes of illustration and, as such, are not intended to limit the embodiments disclosed within this specification. The particular packet processing applications described are provided to better illustrate the applicability of the equivalence class function and the ordering key function to actual packet processing solutions as well as the relationship that exists between the two functions within such solutions.

In an embodiment where the packet processing application performs traffic management, two or more packet units can be said to be members of the same equivalence class when the two or more packets units belong to the same flow. Within a traffic management application, ordering, and thus the ordering key function, may be optional. The ordering key function may, however, be utilized to indicate ordering, e.g., priority, among packet units within a same flow.

In an embodiment where the packet processing application performs segmentation and re-assembly, two or more packet units can be said to be members of the same equivalence class when each packet unit is part of the same packet, e.g., an IP packet, that is to be re-assembled. When performing segmentation and re-assembly, each packet unit will correspond to a fragment of a packet. The ordering key function can indicate the order of all packet fragments of a particular packet that must be observed in order to correctly re-assemble the packet.

In an embodiment where the packet processing application re-sequences packet units, two or more packet units can be said to be members of the same equivalence class when each of the packet units belongs to a same connection, flow, or stream, as the case may be. When re-sequencing packet units, the ordering key function can indicate when one packet unit is to come before another packet unit within a given sequence.

In another embodiment of the present invention, when translating the equivalence class function and the ordering key function into a packet processing application, ready flags optionally may be included within the packet processing application to guide the timing of packet data removal from the packet data storage unit. As shown, a ready flag, for example, can be associated with each row. The ready flag for each row can be set and/or cleared in an application specific manner. Examples of possible criteria for operation of the ready flag follow which build upon the example embodiments described above.

Within a packet processing application performing traffic management, the criterion can be a policy for packet unit flow to be allocated when bandwidth is true. That is, a ready indication can indicate that, per a transmission ration policy, a particular flow is allowed to emit a packet unit from the packet data storage unit. For a packet processing application performing segmentation and re-assembly, the ready flag for a row may be set when a complete packet has been re-assembled, e.g., where each fragment of the packet to be re-assembled has been received and stored in the selected row. In the case of a simple buffer, the ready flag may be set when the buffer is non-empty.

The ready flag for each row also can be used in conjunction with other factors such as, for example, scheduling algorithms, implemented by the system utilizing the packet processing application. The scheduling algorithms, taken in combination with the ready flag(s), can select a particular equivalence class for removal. For example, setting a ready flag may trigger an event that causes a packet data removal process to be activated.

Implementing the packet processing application in this manner, e.g., as a generic block, allows application specific characteristics, e.g., the scheduling algorithms, to be decoupled from packet data storage and packet data storage implementation. Rather than co-mingling code that performs these different tasks within a single larger application or software-component, each particular task can be isolated and an interface between the different components can be implemented. For example, rather than co-mingling code implementing the packet data storage unit with the code implementing the scheduling algorithms, each can be maintained as a separate component with an interface that allows the scheduling component to drive aspects of the packet processing application, e.g., a ready flag. A further benefit is that the equivalence/ordering model may be exported as an application programming interface (API) that allows high-level packet processing descriptions to specify required organizations of packet units.

In another embodiment, the equivalence/ordering model or API can be used in support of a declarative specification of requirements that may be added to a high level programming language. The API may be added, for example, as an extension to the high level programming language. Accordingly, rather than declaring a packet data structure and then writing programming language code that makes use of the data structure as with a conventional imperative programming language such as C or the like, a more packet focused and implementation-independent, declaration language can be provided.

FIG. 3 is an example of a programmatic description 300 of a header of a packet unit in accordance with another embodiment of the present invention. Description 300, as shown, can be implemented in a declarative language. As such, description 300 can provide a description of a packet processing application that, when implemented, performs segmentation and re-assembly of IP packets. For purposes of this example, a packet unit is a fragment of an IP packet.

As noted, the format of description 300 is declarative in nature. The statement "format F_IPv4_header=(" specifies that the format of the packet units to be processed conforms with the Internet Protocol. Further, the statement indicates that the lines to follow until the closing ");" operator define the various fields and field attributes of the header of each packet unit.

Regarding the fields of the header, the statement "VERSION:4," indicates that the size of the field indicating the version of the Internet Protocol to which each packet unit must conform is 4 bits wide. The statement "ID:16," indicates that the ID field of the packet header is 16 bits in width. When an IP packet is segmented, each fragment of the segmented IP packet will contain the same value in the "ID" field. The statement "FRAG_OFFSET:13," indicates that the "FRAG_OFFSET" field is 13 bits in width. The "FRAG_OFFSET" field of a packet unit, e.g., a fragment of an IP packet, specifies the offset of that fragment within the original IP packet prior to segmentation. It should be appreciated that the particular locations of each field, e.g., the "ID" field and the "FRAG_OFFSET" field, can be determined from the IP specification and, thus, are known.

In this example, the equivalence classes can be defined as the value of the "ID" field of each respective fragment. Thus, two packet units will be equivalent if each is a fragment of the same IP packet, e.g., has the same value in the "ID" field. Accordingly, the equivalence class function, as shown, can be defined as equivalence=p1.ID==p2.ID. This statement indicates that the ID field of two packet units, e.g., packet unit "p1" and packet unit "p2," must be equal for each to be in the same equivalence class. The equivalence class function $f(p)$ can be declared to be the value of the "ID" field of a fragment.

Accordingly, for packet unit re-assembly, the ordering key function for packet units, e.g., fragments, belonging to the same equivalence class, and thus, the same IP packet, can depend upon the value of the FRAG_OFFSET field of each respective packet unit. The ordering key function for packet units can be defined as "ordering=p1.FRAG_OFFSET<p2.FRAG_OFFSET." This statement indicates that the ordering of packet units within an equivalence class will be ascending according to the "FRAG_OFFSET" field. The ordering key function g(p) can be declared to be the "FRAG_OFFSET" field of a fragment.

During packet re-assembly, fragments can be stored until each of the fragments of a particular IP packet have been received. Responsive to receiving each of the fragments of a particular IP packet, the fragments can be joined to reconstruct and output the original IP packet. When a fragment is received, the $f(p)$ value, in this case the "ID" field, is used to insert the fragment into the correct row of the packet data storage unit. In this example, one row in the packet data storage unit exists for each packet being re-assembled. The value of g(p), in this case the "FRAG_OFFSET" field, is used to place the fragment into the correct ordered position within the row of the packet data storage unit. Responsive to receiving all fragments of a given IP packet, the complete reassembled IP packet can be read and output from the completed row.

As used within this specification, the term "output" or "outputting" can mean reading data from a memory, generating a signal representing that data, and providing the signal to another system, component, or circuit element. In other aspects, and depending upon the particular packet processing application being implemented or use of the term within this specification, "output" or "outputting" can mean storing data within memory or writing data to an output device. For example, writing data to an output device can include writing data to a display screen where the data is displayed or writing data to a transducer, such as a speaker, where the data is converted to sound.

It should be appreciated that while the example illustrated in FIG. 3 utilized functions for ƒ(p) and g(p) that depended upon a single field of the packet units, more complex expressions may be used that rely upon two or more of the packet unit fields. Further, the particular fields utilized are not restricted to those existing within the header, as portions of the payload and/or the trailer also may be used or incorporated into each respective function.

The examples to follow illustrate various statements that may be included within a programmatic description of a packet processing application when implemented using a declarative language. As noted, when compiled, or otherwise processed, the declarative statements can be translated into a synthesizable HDL file or files or a functional, general-purpose, high level programming language file or files.

For example, a declarative statement such as "forward on <portname>" can be provided. A compiler can interpret the instruction "forward" within this declarative statement to mean that the current packet being handled will be forwarded on the port name that is provided in the operand field "portname."

Figure 4:
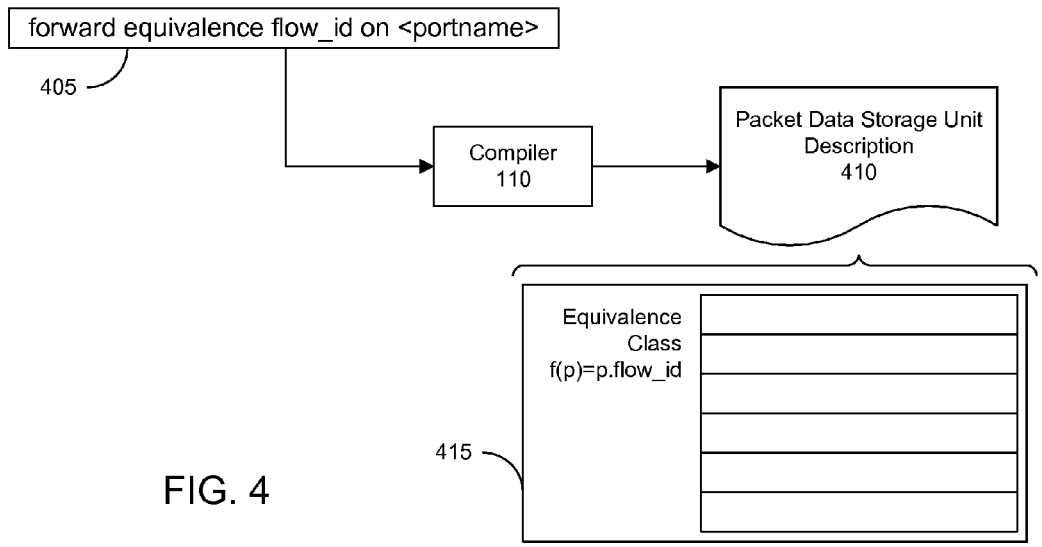
FIG. 4 is a third block diagram illustrating an example of a declarative statement that can be translated into a packet processing application in accordance with another embodiment of the present invention.

FIG. 4 is a third block diagram illustrating an example of a declarative statement 405 that can be translated into a packet processing application in accordance with another embodiment of the present invention. Declarative statement 405 illustrates a more complex version of the "forward" instruction described above. In this example, the compiler 110 can interpret declarative statement 405 to mean that the current packet being processed will be selectively forwarded on the enumerated port according to the value of the "flow_id" field as used for the equivalence function. Interpretation of statement 405 by compiler 110 would automatically generate a packet processing application 410 specifying a packet data storage unit 415. The packet processing application 410 can be specified in either an HDL or a functional, general-purpose, high level programming language. Per the packet processing application 410, packet data storage unit 415 can be placed at the output of the port enumerated in declarative statement 405. As shown, packet data storage unit 415 has rows indexed by the possible values of the "flow_id" field. The single declarative statement 405 provides a fast and efficient way of automatically generating a traffic management block that can be incorporated into a circuit design.

Figure 5:
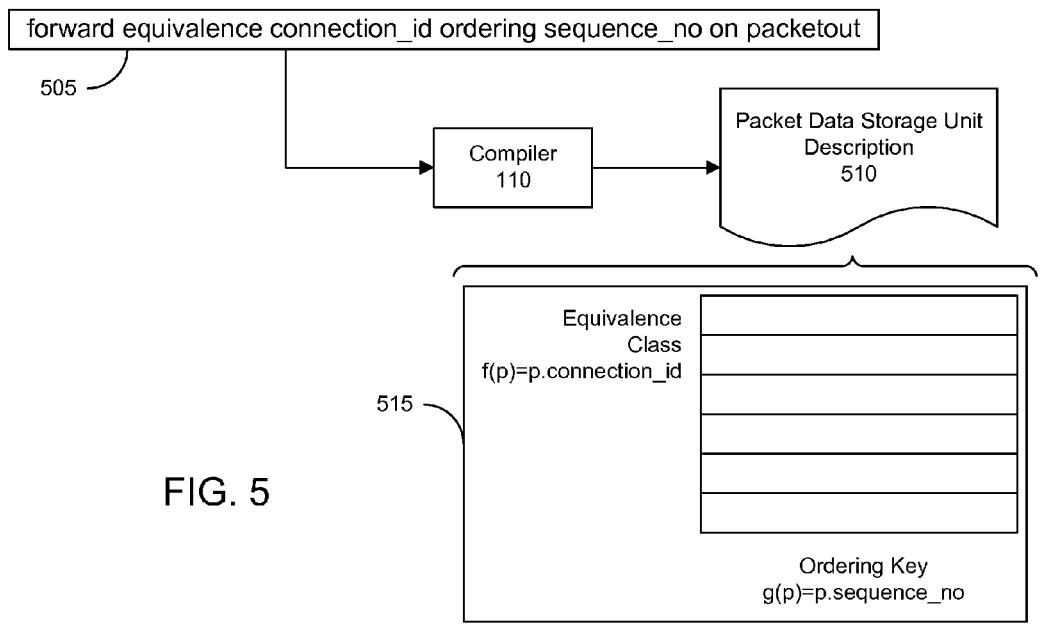
FIG. 5 is a fourth block diagram illustrating an example of a declarative statement that can be translated into a packet processing application in accordance with another embodiment of the present invention.

FIG. 5 is a fourth block diagram illustrating an example of a declarative statement 505 that can be translated into a packet processing application in accordance with another embodiment of the present invention. Declarative statement 505 illustrates yet another more complex version of the "forward" instruction. In this example, compiler 110 can interpret declarative statement 110 to mean that the current packet will be selectively forwarded from the enumerated port according to the value of the "connection_id" field within the equivalence class for the current packet unit. The current packet will be ordered in the equivalence class according to the value of the "sequence_no" field. Interpretation of declarative statement 505 by compiler 110 would automatically generate a packet processing application 510 specifying a packet data storage unit 515. As noted, the packet processing application can be specified in either an HDL or a functional, general-purpose, high level programming language. Per packet processing application 510, packet data storage unit 515 can be placed at the output of the enumerated port as specified within declarative statement 505. As shown, packet data storage unit 515 has rows indexed by the possible values of the "connection_id" field. The ordering within each row is determined according to the "sequence_no" field. This statement may be utilized to automatically generate a re-sequencing block.

The declarative statements illustrated with respect to FIGS. 4 and 5 may be independently representative of, and translated into, generalized packet data storage unit descriptions. When combined with additional descriptive code, as illustrated in FIG. 3, the compiler can automatically generate more detailed packet processing applications. For example, sizing and resourcing of the required block may be inferred from the various fields and field attributes specified. The inclusion of the forward instructions illustrated in FIGS. 4 and 5 can lead to auto-generation of insertion operations.

From the examples provided within this specification, analogous types of declarative statements can be created for association with input ports. The structures specified may be placed at the input of the port enumerated within the declarative statement being processed. Thus, the use of equivalence classes and ordering keys, as shown with respect to FIGS. 4 and 5, may be used to automatically generate data storage operations and/or data removal operations. The storage of packet data may be implemented using arrays, linked-lists, or a combination of both where one technique is used for input and the other technique is used for output. Further, the array and/or linked-list methods may be utilized within either a hardware-based or a software-based packet processing application. It should be appreciated that arrays and linked lists are offered as examples of possible ways to implement the embodiments disclosed within this specification. The embodiments, however, are not intended to be limited to any particular implementation or exclude other techniques for organizing the packet data storage unit.

Figure 6:
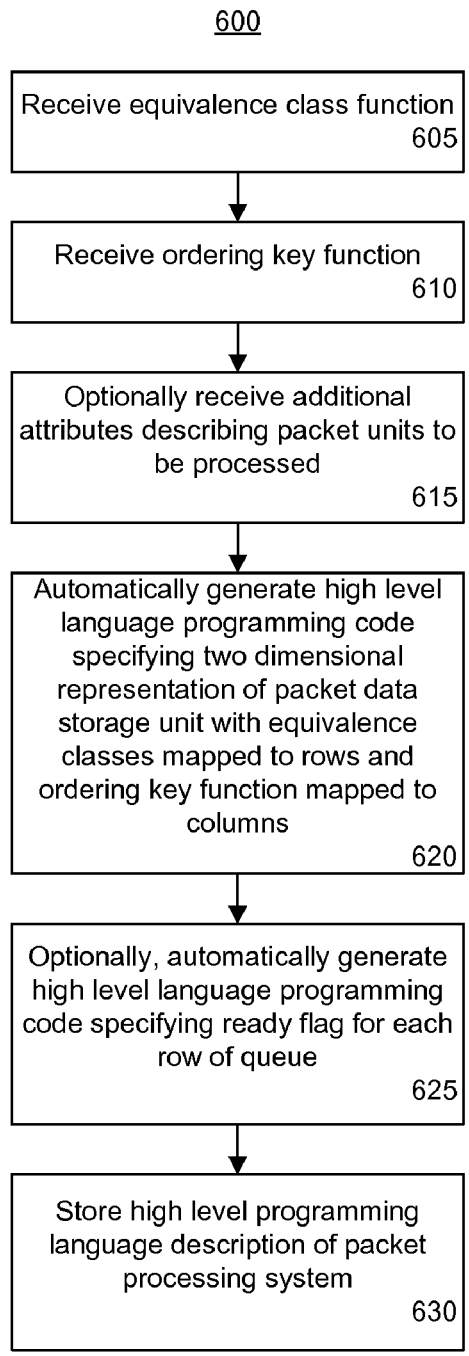
FIG. 6 is a flow chart illustrating a method of automatically generating a packet processing application in accordance with another embodiment of the present invention.

FIG. 6 is a flow chart illustrating a method 600 of automatically generating a packet processing application in accordance with another embodiment of the present invention. Method 600 can be performed by a compiler, executing within a suitable computer, as described with reference to FIGS. 1-5 of this specification. Accordingly, method 600 can begin in step 605, where an equivalence class function can be received. In step 610, an ordering key function can be received. In step 615, one or more additional attributes describing the packet units to be processed, e.g., fields of the packet units, may optionally be received. It should be appreciated that the equivalence class function, the ordering key function, and any additional information may be received in the form of a declarative description, as a series of individual inputs provided through a user interface of the compiler, or the like.

In step 620, the compiler can automatically generate high level language programming code that specifies a two dimensional representation of a packet data storage unit or queue. In doing so, the compiler can automatically map rows of the packet data storage unit to possible values of the equivalence class function. The compiler further can generate the high level language programming code to specify that the ordering of packet units within each respective row, e.g., each equivalence class, can be mapped to possible values generated by calculating the sequential key function.

In step 625, high level programming language code can be optionally and automatically generated to specify a ready flag for each row of the packet unit storage unit. In step 630, the resulting high level language programming code can be stored in memory.

Once generated, the resulting description of the packet processing application can be further processed by an EDA tool capable of generating a netlist or other hardware description that can be used to fabricate an IC-based implementation of the packet processing application. In the case of a programmable IC, whether partially programmable or fully programmable, the description of the packet processing application can be processed to generate a netlist or a bitstream that, when loaded into the programmable IC, can program or configure the programmable IC to implement the packet processing application. For example, the description of the packet processing application can be technology mapped, placed, and routed for implementation with the programmable IC.

The flowcharts in the figure illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of implementing a packet processing system, the method comprising:
receiving a user input specifying a first function and a second function;
automatically generating a high level programming language description of a packet processing application comprising a packet data storage unit, wherein packet units are stored within the packet data storage unit at locations determined according to the first function and the second function; and
storing the high level programming language description;
wherein the packet data storage unit comprises rows configured to store packet units in which the rows are mapped to potential values of the first function and ordering of packet units within each row is determined by the second function.

2. The computer-implemented method of claim 1, further comprising selecting the first function to define whether at least two packet units are members of a same equivalence class.

3. The computer-implemented method of claim 2, further comprising defining the first function to depend upon at least one field of the packet units.

4. The computer-implemented method of claim 3, wherein automatically generating a high level programming language description comprises outputting high level programming language code defining the packet data storage unit to store packet units that are members of the same equivalence class within a same row of the packet data storage unit.

5. The computer-implemented method of claim 1, further comprising selecting the second function to define an ordering of at least two packet units that have been determined to be members of a same equivalence class.

6. The computer-implemented method of claim 5, further comprising defining the second function to depend upon at least one field of the packet units.

7. The computer-implemented method of claim 6, wherein automatically generating a high level programming language description comprises outputting high level programming language code defining the packet data storage unit to order packet units that are members of a same equivalence class according to the second function.

8. The computer-implemented method of claim 1, further comprising selecting the high level programming language to be a hardware description language.

9. The computer-implemented method of claim 1, further comprising selecting the high level programming language to be a functional, general-purpose high level programming language.

10. The computer-implemented method of claim 1, wherein receiving a user input specifying a first function and a second function further comprises receiving declarative programming language code comprising the first function and the second function.

11. A computer-implemented method of specifying a packet processing system, the method comprising:
   receiving a declarative description of packet units to be processed;
   selecting, from within the declarative description, a first function determining packet unit equivalence and a second function determining packet unit ordering among packet units determined to be members of a same equivalence class according to the first function;
   automatically generating a high level programming language description of a packet processing application according to the first function and the second function; and
   storing the high level programming language description;
   wherein the packet data storage unit comprises rows configured to store packet units in which the rows are mapped to potential values of the first function and ordering of packet units within each row is determined by the second function.

12. The computer-implemented method of claim 11, wherein packet units of a same equivalence class are within each row, and wherein the first function depends upon at least one field of the packet units and the second function depends upon at least one field of the packet units.

13. A computer program product comprising:
   a non-transitory computer-usable medium comprising computer-usable program code that implements a packet processing system, the computer-usable medium comprising:
   computer-usable program code that receives a user input specifying a first function and a second function;
       computer-usable program code that automatically generates a high level programming language description of a packet processing application comprising a packet data storage unit, wherein packet units are stored within the packet data storage unit at locations determined according to the first function and the second function; and
       computer-usable program code that stores the high level programming language description;
       wherein the packet data storage unit comprises rows configured to store packet units in which the rows are mapped to potential values of the first function and ordering of packet units within each row is determined by the second function.

14. The computer program product of claim 13, wherein the computer-usable medium further comprises:
   computer-usable program code that selects the first function to define whether at least two packet units are members of a same equivalence class; and
   computer-usable program code that defines the first function to depend upon at least one field of the packet units.

15. The computer program product of claim 14, wherein the computer-usable program code that automatically generates a high level programming language description comprises computer-usable program code that outputs high level programming language code defining the packet data storage unit to store packet units that are members of the same equivalence class within a same row of the packet data storage unit.

16. The computer program product of claim 13, wherein the computer-usable medium further comprises:
   computer-usable program code that selects the second function to define an ordering of at least two packet units that have been determined to be members of a same equivalence class; and
   computer-usable program code that defines the second function to depend upon at least one field of the packet units.

17. The computer program product of claim 16, wherein the computer-usable program code that automatically generates a high level programming language description comprises computer-usable program code that outputs high level programming language code defining the packet data storage unit to order packet units that are members of a same equivalence class according to the second function.

18. The computer program product of claim 13, wherein the computer-usable medium further comprises computer-usable program code that selects the high level programming language to be a functional, general-purpose high level programming language or a hardware description language.

19. The computer program product of claim 13, wherein the computer-usable program code that receives a user input specifying a first function and a second function further comprises computer-usable program code that receives declarative programming language code comprising the first function and the second function.

20. The computer program product of claim 19, wherein the computer-usable medium further comprises computer-usable program code that identifies at least one field and attribute of the field from the declarative programming language code.

* * * * *